Sept. 13, 1955  M. P. HANSEN  2,717,576

WASHING MACHINE SYSTEM FOR MILKING MACHINES

Filed Nov. 20, 1952

INVENTOR.
Melvin P. Hansen
ECKHOFF & SLICK, Attys.
BY
A member of the firm

United States Patent Office 2,717,576
Patented Sept. 13, 1955

---

2,717,576

WASHING MACHINE SYSTEM FOR MILKING MACHINES

Melvin P. Hansen, Loleta, Calif.

Application November 20, 1952, Serial No. 321,593

1 Claim. (Cl. 119—14.18)

This invention relates to a washing system for a milking machine. In the past, it has been necessary to employ a substantial amount of expensive auxiliary equipment for use in cleaning automatic milking machines. Such auxiliary equipment has ordinarily included circulating pumps, sanitary return lines, sanitary fittings, solution tanks and the like, all of which add to the complexity and cost of a complete milking system. Further, the washing systems heretofore proposed have required a considerable quantity of water and detergents as well as a large expenditure of time in their use.

The objects of the present invention are to produce a washing system and washing equipment for a milking machine which is inexpensive, which uses few parts other than the standard milking machine parts, which requires only a small amount of labor for the washing operation and which is economical of water and detergents.

The washing system of the present invention will be described in connection with a De Laval combine milking system, but it is to be understood that the description of the system in connection with this particular milking machine is only for convenience and it will be apparent to a person skilled in the art that the system may be applied to many different types of milking machines.

The type of milking machine to which the present invention is applicable is the type having two lines located along the milking stalls, one of said lines being a milk line and the other line being a vacuum line. The system is provided with a vacuum pump which applies a vacuum to both the milk line and the vacuum line and a pulsator is provided between each set of teat cups and the vacuum line whereby chambers of the teat cups are alternately connected with the vacuum system and with the atmosphere to produce the milking action.

In the drawings forming a part of this application, I have illustrated only that portion of the complete milking system which is applicable to my washing system, and it is to be understood that the parts of the system not illustrated are parts of the standard milking machine.

In the drawings forming part of this application, Figure 1 is a partial diagrammatic view of a milking machine embodying my washing system.

Figure 1:
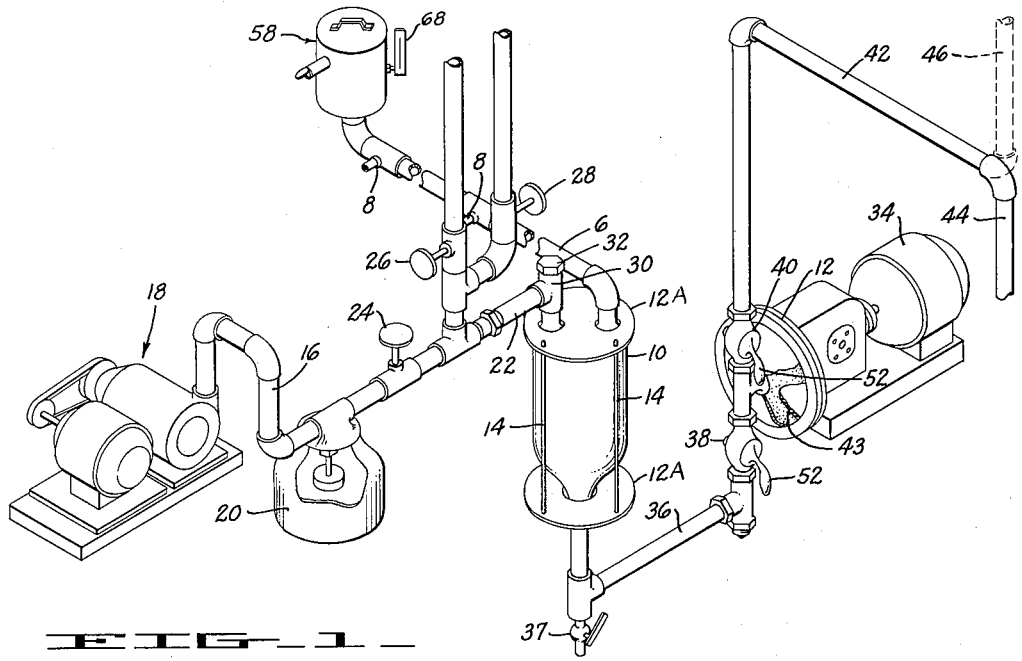

Referring to the drawing by reference characters, there is shown a milk line 6 having attached thereto a number of connectors 8 for receiving milk. In service, the connectors 8 would ordinarily be connected with a milk hose. One end of the milk line 6 terminates at the top of vessel 10 which is the milk receiver. The milk receiver 10 is ordinarily made of glass and its purpose is to receive the milk after it is brought from the cow and before the milk has been passed onto a larger storage chamber by the milk pump 12. As is later described in more detail, when used with my washing system, the receiver is subjected to some strain because of the violent agitation of the washing liquid therein. Therefore, the receiver 10 is preferably reinforced by having steel plates 12A placed at the top and bottom to give added strength to the structure. Plates 12A are held in place by threaded rods 14.

A line 16 leads to a vacuum pump 18, and through a trap 20 for the purpose of removing any entrained moisture. The line 22 connects the trap 20 with the receiver 10 and this line is provided with a valve 24. Valves 26 and 28 are provided just off the line 22 for the purpose of introducing hot and cold water into the line as hereinafter described. The line 22 enters the receiver 10 through a T 30 which is provided with a cap 32. The cap 32 is easily removable for the purpose of adding detergents, germicides and the like, as desired.

In the normal operation of such a system, the vacuum pump 18 pulls a vacuum on the milk receiver 10 so that milk introduced into line 6 will collect in the receiver 10. The vacuum pump 18 also is connected to the vacuum line of the system but such connection has not been illustrated since it forms no part of the present invention.

In order to remove milk from the receiver 10 without breaking the vacuum on the system, a pump 12 is provided. This pump is of the reciprocating diaphragm type and is driven by the motor 34. The diaphragm is indicated at 43. The pump 12 is connected to the receiver 10 by means of line 36, and a valve 38 is placed between the line 36 and the pump 12. A second valve 40 is connected to the other side of the pump and this valve leads into the discharge pipe 42. A discharge line 44 is provided which discharges the milk into any convenient container and which may be swung into the position shown at 46 when it is desired to wash the system. The line 36 is also provided with a drain valve 37, which is the lowest point in the system.

Figure 2:
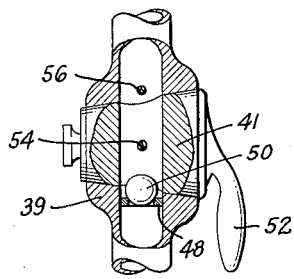
Figure 2 is an enlarged drawing, partially in a section, showing a multi-purpose valve as is used in my washing system.
Figure 3:
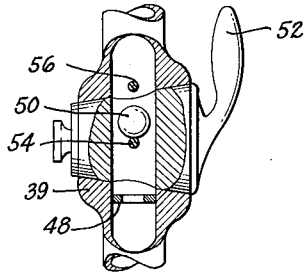
Figure 3 is another view of the valve of Figure 2 showing the position of the parts when the valve is turned to the position for washing the system.
Figure 4:
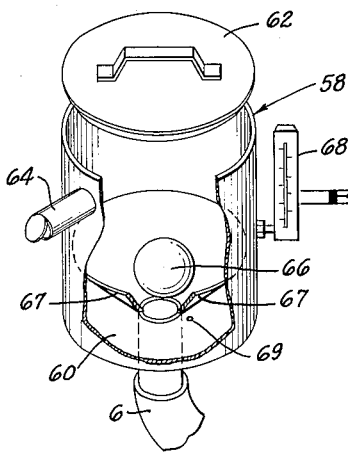
Figure 4 is an enlarged detailed view, partly in section, of the surge tank which is a part of the washing system of the present invention.

The valves 38 and 40 are alike and are shown in detail in Figures 2 and 3. In Figure 2 the valve is shown in the position which is assumed for milking. The valves 38 and 40 have a body portion 39 and a plug 41, which may be rotated therein by means of handle 52. The body 39 has a disc 48 therein which has a central circular aperture. In the center of the valve a small rubber ball 50 is provided which is of sufficient density not to float. When the system of the present invention is used for milking, the valve handles 52 are turned downwardly as is shown in Figure 2. When the valves are in this position they operate as check valves and it is apparent that milk can only pass upwardly through the line. In other words, when the pump 12 makes a suction stroke, the upper valve 40 will be sealed while the lower valve 38 will be opened by the milk pushing against the ball 50, unseating the ball. On the compression stroke of the pump, the ball 50 in valve 38 will be firmly seated by pressure, preventing milk from flowing backward through the system while the ball 50 in valve 40 will be unseated allowing milk to pass through the pipe 42.

In the valves, a stop pin 54 is provided in the plug 41 and a second pin 56 is provided in the body of the valve. When the valve is turned to the position as shown in Figure 3, the pin 54 keeps the ball from the seat 48 so that the ball cannot stop the milk flow. The pin 56 merely keeps the ball from being lost in the discharge pipe. Thus, when the valves are turned to the position shown in Figure 3, liquid may freely pass through the valves in either direction.

At the end of the milk line 6, a stainless steel surge tank is provided. This tank is so located that the top of the tank is slightly below the end of the turned up discharge pipe 46. This consists of a tank 58 having a bottom 60, a cover 62 and an overflow spout 64. The pipe 6 terminates at the bottom of the surge tank as is shown, and a rubber ball 66 is provided within the tank. The rubber ball is of such density that it floats in water. A conical ball guide 67 is provided, so that the ball will be positioned over the end of line 6 when the tank is empty. This guide fits loosely within the tank and may be removed for cleaning. It is thus apparent, that when the surge tank is partially filled with liquid, the ball will float, allowing liquid to flow freely back and forth through the surge tank while if the tank is empty, the ball 66 will seal the tank, so that the vacuum can be drawn on the milk line 6. A small hole 69 is provided in the bottom of the surge tank to provide for positive draining.

If desired, a thermometer 68 may be provided for measuring the temperature of the cleaning solution.

Having described the equipment which is used, I shall now describe the actual procedure of washing the system. When the milking is completed, water would ordinarily be drawn through the teat cups at the far end of the line by vacuum and then pumped through the discharge pipe. Following this, the washing proper commences. The vacuum valve 24 is first closed and the discharge pipe 44 is turned to the position shown at 46. The valve handles 52 of valves 38 and 40 are then turned upward to the position shown in Figure 3. The hot water valve 26 is then opened and the receiver 10 partially filled. The cap 32 is removed and a desired amount of detergent added to the system. Any of the common detergents may be used. The cap 32 is then replaced and the pump 12 started. The hot water valve 26 is again opened and sufficient water is added to the system to cause an overflow from the spout 64 of the surge tank. The system is left running for the desired length of time, suitably about 15 minutes, during which time the pump produces a reciprocating agitation in the entire system, thoroughly washing all of the parts. If desired, either of the valves 38 or 40 can be turned at right angles, shutting off the flow of water in one side of the system, forcing all washing action to be in the opposite side of the system. After the desired washing time, the valve handles 52 are turned to the downward position as is shown in Figure 2 which causes the pump 12 to discharge the water through the line 46. This is continued until the water level is slightly below the top of the receiver 10 whereupon the vacuum valve 24 is opened. This creates a vacuum in the receiver 10, and the valve 37 may then be opened. The inrush of air through the valve 37 creates a violent turbulence within the receiver 10, which results in washing the top of the receiver 10 and the line 22. The drain valve 37 and the vacuum valve 3 are then closed and the pump 12 then causes the remaining solution to be discharged through the discharge pipe. When no more liquid is discharged through the discharge pipe 46, the pump is stopped, the valve 37 is opened and the valves 38 and 40 are turned to the up or washing position. This allows the entire system to drain through valve 37.

When the washing step is completed, the system should then be rinsed. To rinse the system, the drain valve 37 is closed and the cold water valve 28 opened. Water is allowed to run until it flows from the spout 64 of tank 58. The water is allowed to flow until a thorough rinse is secured. If desired, the system may be rinsed with warm water in which case both valves 26 and 28 would be opened and the water adjusted to the desired temperature. The valves 26 and/or 28 are then closed and the handles on valves 38 and 40 turned downward and the pump 12 started. This causes the water to be pumped from the line 46 and when no more water flows through the system, the drain valve 37 is again opened and the valves 38 and 40 turned up. This permits the entire system to drain.

After rinsing, the system is then sterilized. This can be accomplished by closing the drain valve 37, and partially filling the receiver 10 with water by opening either valve 26 or 28. The cap 32 is removed and the required amount of a sterilizing chemical added. The cap 32 is then replaced and the pump 12 started and the valves 26 or 28 opened until water overflows. The pump 12 can then be stopped and the system allowed to stand with the germicidal solution therein for the required length of time to sterilize the system. The valves 38 and 40 are then turned down, and the pump 12 started which will pass the germicidal solution out through the discharge pipe 46. The pump 12 is then stopped, the discharge pipe turned in position shown at 44, the drain valve 37 is opened and valves 38 and 40 turned to the upper position. This permits the entire system to drain. At this time, the trap 20 should be removed and emptied.

The system is now clean. The drain valve 37 is closed, the vacuum valve 24 opened and the valves 38 and 40 turned downward. The system is now ready for milking.

It is believed apparent that from the above description I have provided a novel system of washing a milking machine which is simple to use, and which employs few parts other than standard milking machine parts.

Although my washing system has been described in conjunction with a milking machine, it will be apparent to those skilled in the art that the system is applicable to any system wherein one desires to wash out a sanitary pipe line utilizing a reciprocating pump.

I claim:

A milking machine of the class described having a milk line under vacuum leading to a milk receiver, a reciprocating pump for withdrawing milk from said receiver, a surge tank attached to the milk line at a point distant from the milk receiver, said surge tank having a floating check valve at the bottom thereof, and valve means attached to said reciprocating pump which may be turned to a first position to permit liquid to pass only one way through said pump and turned to a second position to permit liquid to pass both directions through said pump.

References Cited in the file of this patent

UNITED STATES PATENTS

| | | |
|---|---|---|
| 695,323 | Mittinger | Mar. 11, 1902 |
| 1,194,542 | Raymond | Aug. 15, 1916 |
| 1,393,387 | McCornack | Oct. 11, 1921 |
| 1,559,315 | Daysh | Oct. 27, 1925 |
| 2,680,445 | Hemminger | June 8, 1954 |
| 2,685,884 | Heckendorf | Aug. 10, 1954 |